B. F. SEYMOUR.
SHOCK ABSORBER.
APPLICATION FILED JUNE 4, 1918. RENEWED MAY 15, 1920.
1,366,422. Patented Jan. 25, 1921.
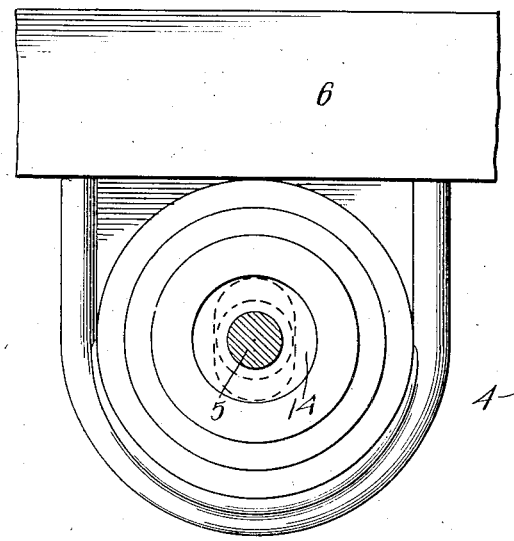
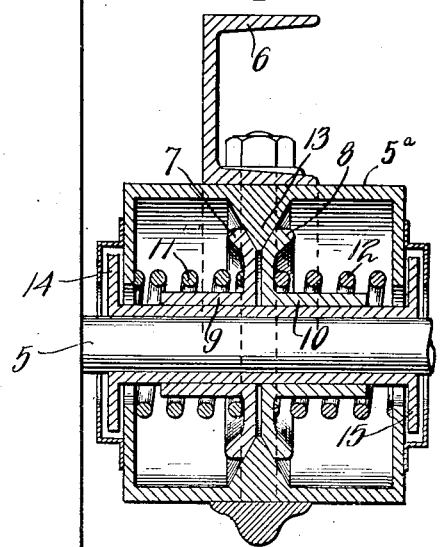
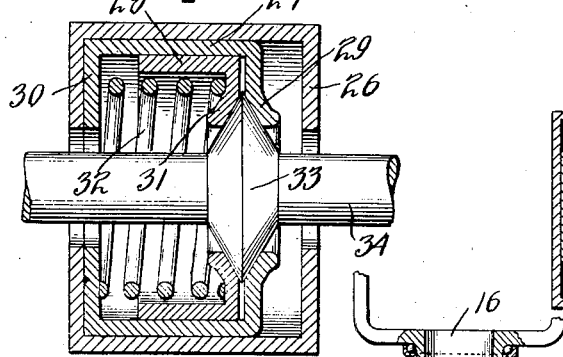
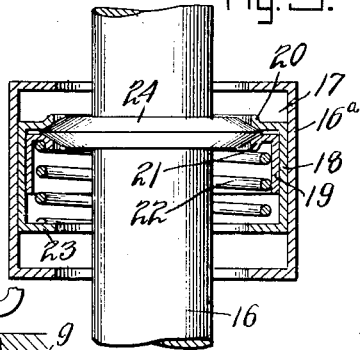
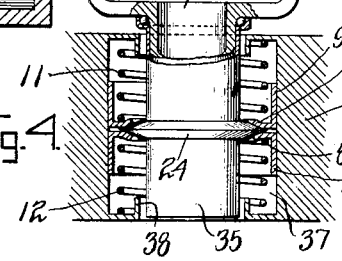
Inventor
Benjamin F. Seymour
Attorney

UNITED STATES PATENT OFFICE.

BENJAMIN F. SEYMOUR, OF WASHINGTON, DISTRICT OF COLUMBIA.

SHOCK-ABSORBER.

1,366,422.      Specification of Letters Patent.      Patented Jan. 25, 1921.

Application filed June 4, 1918, Serial No. 238,196. Renewed May 15, 1920. Serial No. 381,746.

*To all whom it may concern:*

Be it known that BENJAMIN F. SEYMOUR, a citizen of the United States, residing at Washington, District of Columbia, has invented certain new and useful Improvements in Shock-Absorbers, of which the following is a specification.

This invention relates to shock absorbers or shock diffusers and consists in the combinations and arrangements of elements hereinafter disclosed and particularly set forth in the accompanying claims.

The invention has for its purpose to provide a device of this character which serves both as the resilient medium and shock absorber for the vehicle, and wherein all motions incident thereto are transmitted axially of the wheel, to the end of obtaining substantially complete flexibility with maximum rigidity of the wheel structure.

Another object of the invention is to provide a shock absorber for motor vehicles in which the wheel structure is rigid and the resilient or shock sustaining means are interposed between the vehicle axle and the chassis of the car in such a manner that the body of the vehicle will be free to operate with a substantially uniform motion and with the required resiliency.

A further purpose of the invention resides in adapting the device herein disclosed to serve as a resilient mount for a search light, or other like structure, to the end that such device will be maintained steady regardless of the movement or motion imparted to its supporting structure.

The invention is shown by way of illustration by the accompanying drawings, wherein:

Figure 1 is a side elevational view of the device showing its application to a vehicle.

Fig. 2 a central sectional view thereof.

Fig. 3 a modified construction, and

Figs. 4 and 5 illustrate the application of the construction as a support for search lights, or the like.

Referring to the construction in further detail, and wherein like characters of reference indicate corresponding parts in the different views shown, 4 represents the wheel of a vehicle, 5 the usual axle thereof, and 6 the chassis of the car, which are all of the usual, or otherwise suitable construction.

A pair of cone heads 7 and 8, having sleeve portions 9 and 10 respectively, are mounted to have axial movement on the axle 5 of the vehicle, and a pair of springs 11 and 12 surrounding said sleeves hold said cone heads in resilient contact with the rim or wedging member 13 that is secured to the chassis 6, and thereby form a floating suspension or bearing therefor that allows of substantially uniform motion to the vehicle body with respect to the axle, as will be obvious.

The abutments 14 and 15 fixedly mounted on the axle 5 afford the necessary seats or bearings for the container or housing 5ᵃ against which the springs 11 and 12 bear and thereby all relative movement between the wedging member 13 and the cone heads 7 and 8 is taken up by the lateral motion of said cone heads through their respective springs and against the abutments 14 and 15. Thus the two cone heads 7 and 8 will move oppositely and equally under the motion of the member 13 transversely of the shaft, and either of the cone heads 7 and 8 will take up any lateral movement of the chassis longitudinally of the shaft.

In the construction shown in Fig. 3 the casing 26 contains the nested sleeves 27 and 28 having the cone heads 29 and 31 that coöperate with the wedge member 33 on shaft 34 of the vehicle wheel. The spring 32 seats against the flange 30 of sleeve 27 and the cone head 31.

The structure shown in Fig. 4 comprises a portion 36 having therein a chamber or recess 37 whose end walls are turned in, as at 38, to provide means for retaining the pair of springs 11 and 12 that coact against the pair of sleeves 9 and 10 free to work in said chamber. The two sleeves 9 and 10 have coöperating cone elements 7 and 8 that are frictionally engaged by the wedge element 24 on the shaft 35 carrying the bracket 16 and on which bracket is mounted the member for resilient support.

In the arrangement shown in Fig. 5 the supporting structure 16ᵃ provides a suitable chamber 17 within which is located the pair of sleeves 18 and 19 having respectively the wedge elements 20 and 21, and said sleeve 19 is contained wholly within the sleeve 18, as shown.

A resilient medium, preferably in the form of a spiral spring 22, bears against a flange 23 on the sleeve 18 and against the wedge member 21 of the sleeve 19 and thereby tends to maintain said wedge elements in opposed tension. A wedging member 24 is interposed between the wedge elements 20 and 21 in such a manner that such wedge elements will allow said member 24 to have substantially universal movement within its bearing. The member 24 preferably provides a supporting member for a bracket or other support (not shown) adapted to hold a search light or similar device.

It will therefore be seen that any jarring to which the support 16 is subjected will be absorbed before reaching the search light or other article held in the bracket and in like manner said bracket may have limited resilient movement in a lateral direction or angle to the lateral.

It will be obvious of course that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

Having thus described my invention what I claim as new and desire to protect by United States Letters Patent is:

1. In a shock absorber the combination of a shaft portion, annular and laterally movable resilient members associated with said shaft portion, and a supporting structure sustained by said resilient members, substantially as set forth.

2. In a shock absorber the combination of a shaft portion, laterally movable and resilient cone elements associated with said shaft portion, and a supporting structure sustained to have universal movement by said resilient cone elements, substantially as set forth.

3. In a shock absorber the combination of a shaft portion, a pair of opposed cone elements laterally movable on the shaft portion, resilient elements associated with said cone elements, an annular wedge element disposed between the cone elements, and a supporting structure mounted on said wedge element, substantially as set forth.

4. In a shock absorber the combination of a shaft portion, a pair of opposed cone elements having sleeves laterally movable on the shaft portion, resilient elements surrounding said sleeves and maintaining said cone elements in opposed tension, an annular wedge element disposed between the cone elements, and a supporting structure mounted on said wedge element substantially as set forth.

5. The combination with a vehicle shaft, and a wheel journaled thereon, of a pair of opposed cone elements laterally movable on the vehicle shaft, resilient elements associated with said cone elements, an annular wedge element disposed between the cone elements, and a chassis mounted on said wedge element substantially as set forth.

6. The combination with a vehicle axle and a wheel journaled thereon, of a pair of opposed cone elements having sleeves laterally movable on said shaft, springs surrounding said sleeves and bearing against the cone elements holding the same under opposed tension, an annular wedge element disposed between the cone elements, and a chassis mounted on said wedge element substantially as set forth.

7. In a device of the character described the combination of a supporting structure, a pair of oppositely movable and annular wedge elements, resilient means holding said elements in opposed tension, an annular element interposed between said wedge elements, and a device supported by said annular element.

8. In a device of the character described the combination of a supporting structure, a pair of sleeves having wedge elements, resilient means holding said wedge elements in opposed tension, an annular wedge element resiliently supported between said wedge elements, and a device supported by said wedge element.

In testimony whereof I affix my signature.

BENJAMIN F. SEYMOUR.